Patented Nov. 27, 1951

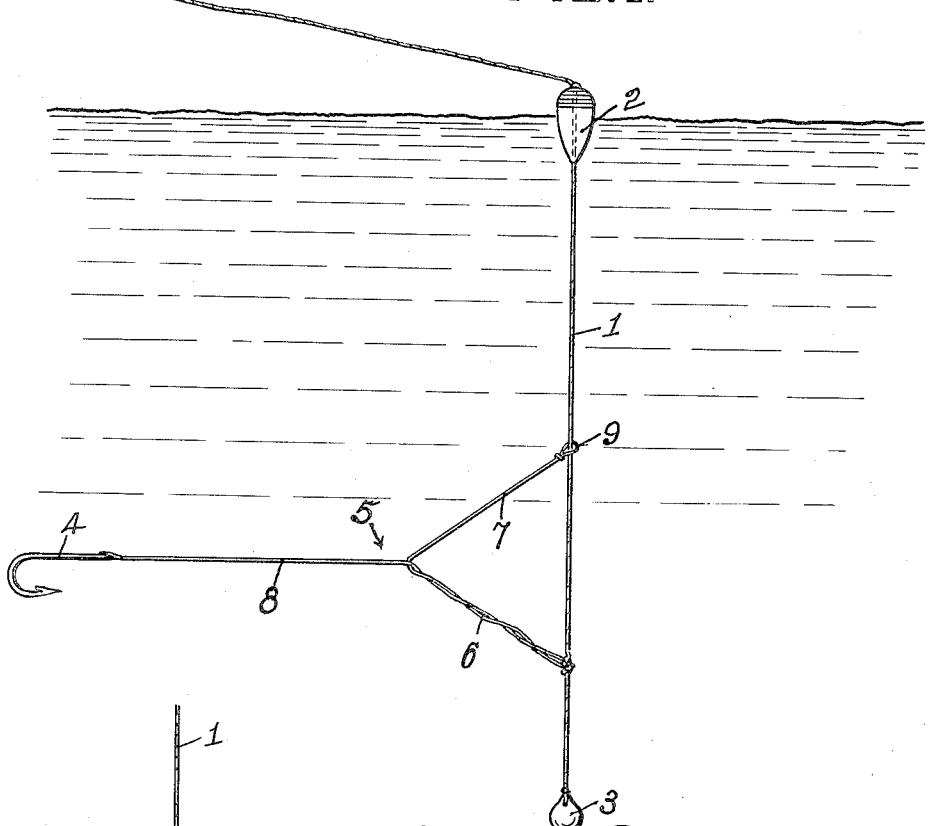
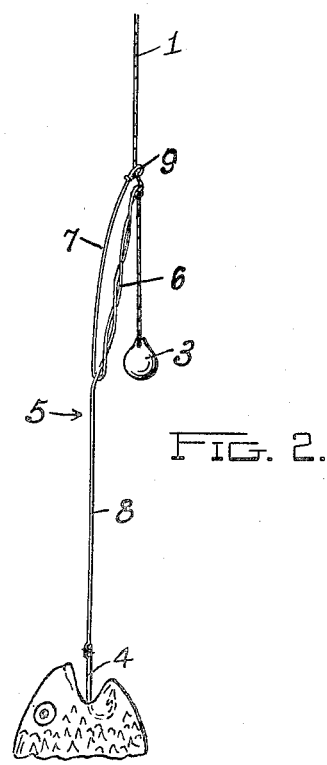

2,576,880

UNITED STATES PATENT OFFICE 2,576,880

FISHING GEAR

Hans C. Jensen, Port Clinton, Ohio

Application May 29, 1947, Serial No. 751,385

2 Claims. (Cl. 43—44.85)

This invention relates to fishing tackle, and particularly to hook attaching and supporting means for a fish line.

In fishing, the common practice is to suspend a fish hook from a line so that the hook shank is positioned substantially vertical with the hook end bill projected upwardly. This presents a hook sidewise to a fish in its normal order of swimming and renders it difficult for the fish to take the hook in its mouth in a manner to be caught by the point. It is found from experience that if, during fishing, the hook can be suspended in the water in reclining instead of endwise position, it is easier for a fish of ordinary size to take it in its mouth and more fish will be caught. Also there is not so much nibbling and stripping of the bait from the hook without results.

The object of the invention is to attach a hook to a line in such manner that it will be yieldingly suspended in the water in horizontally spaced relation to the line and in reclining position, so as to present the outer end instead of the side of the hook to a fish swimming in a normal manner and thereby enhance the prospects of catching the fish.

Further objects and advantages of the invention will be apparent from the following detailed description and from the accompanying drawings, in which—

Fig. 1 is a side elevation of a line having a portion suspended in the water with the hook attaching means embodying the invention projected laterally therefrom, and Fig. 2 is a view showing the hook attaching means drawn down substantially in longitudinal alignment with the line when the weight or pull of a fish or other object is applied thereto.

Referring to the drawings, 1 designates a fish line which may be suspended in the water from a bobber 2, or other suitable support, and held in taut vertical position therein by gravity action of a sinker 3 at its lower end. The hook 4 is attached to the line near its lower end, or in any desired position thereon, by a bridle 5 preferably of spring wire. This bridle is substantially of Y-form with the diverging arms 6 and 7 thereof attached at their free ends to the line 1 in spaced relation lengthwise thereof and with its leg 8 normally projecting laterally from the line in generally reclining position. The shank of the hook is fixed to and forms a longitudinal extension of the leg 8 so that the hook will also normally assume a reclining position in the water, preferably with the bill end of the under side of the shank, as shown.

The lateral pressing and pulling actions exerted on the line by the respective lower and upper arms 6 and 7 tend to support the leg portion 8 and hook 4 in outwardly projected reclining position, and this is augmented by the stiffness of the bridle material. While the resiliency of the leg wire may permit its outer end to sag somewhat under the combined weight of the hook and its bait, this sag is not sufficient to throw the leg and hook out of a reclining position in which the loop end of the hook is presented generally horizontally to be conveniently swallowed or taken into the mouth of a fish when in normal horizontal swimming position.

The lower arm 6 of the bridle is fixedly attached to the line to prevent longitudinal movement thereon, while the upper arm 7 is slidingly engaged with the line by a loop 9 through which the line freely slides. This enables the upper arm 7, upon a downward pull on the bridle, to move into close substantially parallel relationship to the lower arm and the entire bridle to assume a position substantially in longitudinal alignment with the line 1, as shown in Fig. 2. As soon as the drag on the hook is released, the bridle, by the resiliency of its wire, assumes its normal form and position, as shown in Fig. 1.

A fine grade of resilient piano wire may be used for the bridle, and it may be made of a single piece with one arm single and the wire of the other arm doubled back on itself before being extended from the apex of the fork to form the leg, as shown.

I wish it understood that my invention is not limited to the specific construction, arrangement or form of the parts illustrated and described, as it is capable of numerous modifications and changes without departing from the spirit of the claims.

Having thus described my invention, what I claim as new, and desire to secure by United States Letters Patent, is:

1. In a fishing gear including a continuous line to be suspended substantially vertically in the water from a bobber and having a sinker at its lower end to normally maintain the line taut between the bobber and sinker, a spring wire bridle of Y-form having a hook at the outer end of its leg and having its arms substantially vertically spaced with the lower arm fixedly attached at its end to the line and with the free end of the upper arm attached to but freely slidable on the line whereby the bridle normally stands in laterally projected position with the arms separated when the line is taut and which when drawn by a pull downwardly directed on its hook end causes the upper arm to slide down on the line toward the other arm.

2. In a fishing gear including a continuous line to be suspended in the water by a float, a spring wire bridle having two normally divergent arms with one fixedly connected and the other slidably connected at its outer end to the line and having a leg projecting from the inner end of the arms and carrying a hook at its outer end, said bridle being normally of substantially Y-form and projecting laterally from the line when taut and adapted to have its slidable arm displaceable downwardly and inwardly toward the other arm when a pull is applied to the hook end of the bridle in a downward direction generally longitudinal to the line in a finally drawn position.

HANS C. JENSEN.

REFERENCES CITED

The following references are of record in the file of this patent:

UNITED STATES PATENTS

| Number | Name | Date |
|---|---|---|
| 179,490 | Sander | July 4, 1876 |
| 469,016 | Hemenway | Feb. 16, 1892 |
| 779,286 | Kramer | Jan. 3, 1905 |
| 991,800 | Pardon | May 9, 1911 |
| 1,374,942 | Melvin | Apr. 19, 1921 |
| 1,804,084 | Blake | May 5, 1931 |
| 1,943,192 | Semar | Jan. 9, 1934 |
| 2,170,788 | Augenblick | Aug. 22, 1939 |
| 2,189,841 | Skoverski | Feb. 13, 1940 |
| 2,293,294 | Heckman | Aug. 18, 1942 |
| 2,331,215 | Mincenberg | Oct. 5, 1943 |